United States Patent
Jahnke et al.

(10) Patent No.: US 11,094,952 B2
(45) Date of Patent: Aug. 17, 2021

(54) CARBON DIOXIDE REMOVAL FROM ANODE EXHAUST OF A FUEL CELL BY COOLING/CONDENSATION

(71) Applicant: FuelCell Energy, Inc., Danbury, CT (US)

(72) Inventors: Fred C. Jahnke, Rye, NY (US); Anthony M. Leo, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 145 days.

(21) Appl. No.: 16/094,792

(22) PCT Filed: Apr. 20, 2017

(86) PCT No.: PCT/US2017/028487
§ 371 (c)(1),
(2) Date: Oct. 18, 2018

(87) PCT Pub. No.: WO2017/184802
PCT Pub. Date: Oct. 26, 2017

(65) Prior Publication Data
US 2019/0123372 A1 Apr. 25, 2019

Related U.S. Application Data

(60) Provisional application No. 62/325,719, filed on Apr. 21, 2016.

(51) Int. Cl.
*H01M 8/0668* (2016.01)
*H01M 8/04014* (2016.01)
(Continued)

(52) U.S. Cl.
CPC ........ *H01M 8/0668* (2013.01); *B01D 53/002* (2013.01); *B01D 53/047* (2013.01);
(Continued)

(58) Field of Classification Search
CPC ........... H01M 8/0668; H01M 8/04014; H01M 8/04164; C01B 2203/065; C01B 2203/146; B01D 2257/504; F25J 3/067
See application file for complete search history.

(56) References Cited

U.S. PATENT DOCUMENTS

| 4,449,994 A | 5/1984 | Hegarty et al. |
| 8,343,671 B2* | 1/2013 | Qi ..................... H01M 8/04097 429/412 |

(Continued)

FOREIGN PATENT DOCUMENTS

| CA | 2956439 | 4/2017 |
| CN | 104847424 A | 8/2015 |

(Continued)

OTHER PUBLICATIONS

Extended European Search Report for EP17786599.5 dated May 20, 2019 (7 pages).

(Continued)

*Primary Examiner* — Ula C Ruddock
*Assistant Examiner* — Thomas H. Parsons
(74) *Attorney, Agent, or Firm* — Foley & Lardner LLP

(57) ABSTRACT

A system for removing carbon dioxide from anode exhaust gas that has been compressed to form pressurized anode exhaust vapor includes a feed/effluent heat exchanger configured to cool the anode exhaust vapor to a first predetermined temperature and partially condense carbon dioxide in the anode exhaust vapor; a first vapor-liquid separator configured to receive an output of the feed/effluent heat exchanger and separate liquid carbon dioxide from uncondensed anode exhaust vapor; a feed/refrigerant heat exchanger configured to receive the uncondensed anode exhaust vapor from the first vapor-liquid separator, cool the uncondensed anode exhaust vapor to a second predetermined temperature, and condense carbon dioxide in the (Continued)

uncondensed anode exhaust vapor; a second vapor-liquid separator configured to receive an output of the feed/refrigerant heat exchanger and separate liquid carbon dioxide to form hydrogen rich, uncondensed anode exhaust vapor.

15 Claims, 2 Drawing Sheets

(51) Int. Cl.
*B01D 53/047* (2006.01)
*H01M 8/04007* (2016.01)
*B01D 53/62* (2006.01)
*B01D 53/00* (2006.01)
*C01B 3/50* (2006.01)
*F25J 3/06* (2006.01)
*B01D 53/26* (2006.01)
*H01M 8/04119* (2016.01)
*H01M 8/04089* (2016.01)

(52) U.S. Cl.
CPC .......... *B01D 53/265* (2013.01); *B01D 53/62* (2013.01); *C01B 3/506* (2013.01); *F25J 3/067* (2013.01); *F25J 3/0625* (2013.01); *F25J 3/0655* (2013.01); *H01M 8/04014* (2013.01); *H01M 8/04067* (2013.01); *H01M 8/04074* (2013.01); *H01M 8/04164* (2013.01); *B01D 2256/16* (2013.01); *B01D 2256/22* (2013.01); *B01D 2257/504* (2013.01); *B01D 2257/80* (2013.01); *C01B 2203/0283* (2013.01); *C01B 2203/043* (2013.01); *C01B 2203/0475* (2013.01); *C01B 2203/066* (2013.01); *C01B 2203/146* (2013.01); *F25J 2205/40* (2013.01); *F25J 2205/64* (2013.01); *F25J 2220/82* (2013.01); *F25J 2270/02* (2013.01); *F25J 2270/90* (2013.01); *H01M 8/04089* (2013.01)

(56) References Cited

U.S. PATENT DOCUMENTS

| | | | |
|---|---|---|---|
| 8,815,462 | B2 | 8/2014 | Ghezel-Ayagh et al. |
| 2004/0221578 | A1 | 11/2004 | Iijima et al. |
| 2004/0229102 | A1 | 11/2004 | Jahnke et al. |
| 2012/0000243 | A1* | 1/2012 | Bough ................ F25J 3/0266 62/617 |
| 2012/0058042 | A1 | 3/2012 | Zauderer |
| 2013/0111948 | A1* | 5/2013 | Higginbotham ........ F25J 3/067 62/617 |
| 2014/0260310 | A1* | 9/2014 | Berlowitz ............ C07C 1/0485 60/780 |

FOREIGN PATENT DOCUMENTS

| | | | |
|---|---|---|---|
| EP | 2 589 908 A2 | | 8/2018 |
| EP | 3 360 189 A1 | | 8/2018 |
| JP | 05347161 | * | 12/1993 |
| JP | 05347161 A | * | 12/1993 |
| JP | 2007-018907 A | | 1/2007 |
| JP | 2010-228963 A | | 10/2010 |
| JP | 2010228963 A | * | 10/2010 |
| JP | 20100228963 | * | 10/2010 |
| JP | 2012-519649 A | | 8/2012 |
| WO | WO-2009/013455 A2 | | 1/2009 |
| WO | WO-2011/089382 A2 | | 7/2011 |
| WO | WO2011089382 A2 | * | 7/2011 |
| WO | WO-2016/100849 A1 | | 6/2016 |
| WO | WO-2016/196952 A1 | | 12/2016 |

OTHER PUBLICATIONS

Office Action in CA Pat. Appl. 3021632 dated Oct. 3, 2019 (3 pages).
First Office Action in JP 2018-554735 dated Nov. 11, 2019, with English translation (8 pages).
International Search Report and Written Opinion in PCT/US2017/028487 dated Jul. 10, 2017 (8 pages).
Communication pursuant to Article 94(3) EPC in EP 17786599.5 dated Jan. 30, 2020 (6 pages).

* cited by examiner

CARBON DIOXIDE REMOVAL FROM ANODE EXHAUST OF A FUEL CELL BY COOLING/CONDENSATION

CROSS-REFERENCE TO RELATED APPLICATIONS

This application is a U.S. national stage entry of PCT/US2017/028487 filed on Apr. 20, 2017, and claims the benefit of and priority to U.S. Provisional Patent Application No. 62/325,719 filed on Apr. 21, 2016, the entire disclosures of which are incorporated by reference herein.

FIELD

The present disclosure relates to fuel cells. In particular, the present disclosure relates to a system and method for removing carbon dioxide from the anode exhaust of a fuel cell by cooling/condensation.

BACKGROUND

Fuel cells are devices that convert chemical energy stored in a fuel, such as a hydrocarbon fuel, into electrical energy by means of an electrical reaction. Generally, a fuel cell has an anode, a cathode, and an electrolyte layer that together drive chemical reactions that produce electricity. Exhaust, which may comprise a mixture of hydrogen, carbon monoxide, and carbon dioxide, is produced as a byproduct from the anode of the fuel cell. The anode exhaust contains useful byproduct gases such as hydrogen and carbon monoxide, which can be exported as syngas for other uses, such as fuel for the fuel cell or feed for other chemical reactions. However, to prepare the anode exhaust to be suitable for such uses, the carbon dioxide present in the anode exhaust must be removed.

When purifying hydrogen or syngas from a high temperature anode exhaust, a pressure swing adsorption system (PSA) is often used to separate the carbon dioxide and other impurities from the hydrogen or syngas although other purification processes, such as an electrochemical hydrogen separator may be used. Because the anode exhaust has such a high carbon dioxide content, the hydrogen or syngas recovery from the PSA is less than normal, and the cycle time of the PSA may need to be adjusted. Also, the large anode exhaust volume increases the size and cost of the PSA. Conventionally, a larger PSA is used, and the lower hydrogen or syngas recovery is accepted.

A need exists for improved technology, including technology related to a system and method for removing carbon dioxide from the anode exhaust of a fuel cell upstream of the PSA or other purification technologies. Such technology allows for a reduction in size, and therefore, cost of the PSA, and maximizes hydrogen or syngas production.

SUMMARY

In some embodiments, a system for removing carbon dioxide from anode exhaust gas that has been compressed to form a pressurized anode exhaust vapor includes a feed/effluent heat exchanger configured to cool the anode exhaust vapor to a first predetermined temperature and partially condense carbon dioxide in the pressurized anode exhaust vapor; a first vapor-liquid separator configured to receive an output of the feed/effluent heat exchanger and separate liquid carbon dioxide from uncondensed anode exhaust vapor; a feed/refrigerant heat exchanger configured to receive the uncondensed anode exhaust vapor from the first vapor-liquid separator, cool the uncondensed anode exhaust vapor to a second predetermined temperature, and condense additional carbon dioxide in the uncondensed anode exhaust vapor; and a second vapor-liquid separator configured to receive an output of the feed/refrigerant heat exchanger and separate liquid carbon dioxide to form hydrogen rich, uncondensed anode exhaust vapor.

In some embodiments, a fuel cell system includes a fuel cell comprising a cathode, an anode, and an electrolyte matrix provided between the cathode and the anode; a system removing carbon dioxide from anode exhaust gas to form hydrogen rich, uncondensed anode exhaust vapor; and a pressure swing adsorption system configured to separate carbon dioxide and other impurities from the hydrogen rich, uncondensed anode exhaust vapor to purify hydrogen or syngas from the anode exhaust gas. The system includes a feed/effluent heat exchanger configured to cool the pressurized anode exhaust vapor to a first predetermined temperature and partially condense carbon dioxide in the anode exhaust vapor; a first vapor-liquid separator configured to receive an output of the feed/effluent heat exchanger and separate liquid carbon dioxide from uncondensed anode exhaust vapor; a feed/refrigerant heat exchanger configured to receive the uncondensed anode exhaust vapor from the first vapor-liquid separator, cool the uncondensed anode exhaust vapor to a second predetermined temperature, and condense additional carbon dioxide in the uncondensed anode exhaust vapor; and a second vapor-liquid separator configured to receive an output of the feed/refrigerant heat exchanger and separate liquid carbon dioxide to form hydrogen rich, uncondensed anode exhaust vapor.

In some embodiments, a method of removing carbon dioxide from anode exhaust gas includes compressing the anode exhaust gas to form pressurized anode exhaust vapor; cooling the anode exhaust vapor to a first predetermined temperature and partially condensing carbon dioxide in the anode exhaust vapor in a first heat exchanger; receiving an output of the first heat exchanger in a first vapor-liquid separator; separating liquid carbon dioxide from uncondensed anode exhaust vapor in the first vapor-liquid separator; receiving the uncondensed anode exhaust vapor from the first vapor-liquid separator in a second heat exchanger; cooling the uncondensed anode exhaust vapor to a second predetermined temperature and condensing additional carbon dioxide in the uncondensed anode exhaust vapor in the second heat exchanger; receiving an output of the second heat exchanger in a second vapor-liquid separator; and separating, in the second vapor-liquid separator, liquid carbon dioxide from the output of the second heat exchanger to form hydrogen rich, uncondensed anode exhaust vapor.

In one aspect, the first vapor-liquid separator is a first knock out pot, and the second vapor-liquid separator is a second knock out pot.

In one aspect, the liquid carbon dioxide separated in the first knock out pot and the second knock out pot are combined and the total liquid carbon dioxide is fed through a pressure reduction valve to reduce the pressure and temperature of the total liquid carbon dioxide from the first pressure to a second pressure, lower than the first pressure.

In one aspect, the total liquid carbon dioxide having the reduced pressure and temperature may be used as the cooling media in the first heat exchanger. A reheated carbon dioxide stream output from the first heat exchanger may optionally be further reheated using waste heat from a high-temperature fuel cell and sent to an expander to recover additional energy. The expander energy can be recovered as electrical power or mechanical power. The mechanical power may be connected to the anode exhaust compressors to reduce their power consumption.

In one aspect, part of the carbon dioxide is exported for sequestration or other uses. For example, a flow path may be configured to receive a portion of the carbon dioxide separated from the anode exhaust vapor and to export the portion of the carbon dioxide separated from the anode exhaust vapor for sequestration or other uses.

In one aspect, the anode exhaust vapor is compressed to a pressure between 100 and 400 psig prior to entering the first heat exchanger.

In one aspect, an anode exhaust pressure between 100 and 400 psig is the pressure level needed by the pressure swing adsorption system to separate carbon dioxide and other impurities from hydrogen.

In one aspect, the first heat exchanger cools the anode exhaust to approximately −35° F.

In one aspect, the second heat exchanger cools the anode exhaust to approximately −45° F.

In one aspect, the first pressure is between 200 and 400 psig and the second pressure is from 65 to 100 psig.

In one aspect, the total liquid carbon dioxide having the reduced pressure (e.g., 65 psig) is configured to vaporize at a low temperature. Below a pressure of 65 psig, the liquid carbon dioxide may potentially freeze. At a pressure of 65 psig, the liquid carbon dioxide vaporizes at approximately −60° F.

In one aspect, the bulk of the refrigeration duty is accomplished by vaporizing the carbon dioxide, and an external refrigeration duty is reduced to less than 20% of the total duty cooling required.

In one aspect, a controller is programmed to implement any of the method steps described herein.

These and other advantageous features will become apparent to those reviewing the disclosure and drawings.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, disclosed herein is a system for removing carbon dioxide from the exhaust stream produced by an anode of a fuel cell, such as a molten carbonate fuel cell or other type of high temperature fuel cell. When $H_2$ is the desired product, cooling of the anode exhaust and shifting CO in the gas to $H_2$ prior to feeding the anode exhaust, for example, to a PSA is desired so that the equilibrium shift composition favors the conversion of CO to $H_2$. It is understood that although shifting of the gas is not required, it increases the amount of hydrogen which can be exported and the amount of CO2 which is removed. If the desired product is a $H_2$+CO syngas mixture for chemicals production, the gas is cooled to remove excess water, but not shifted.

Figure 1:
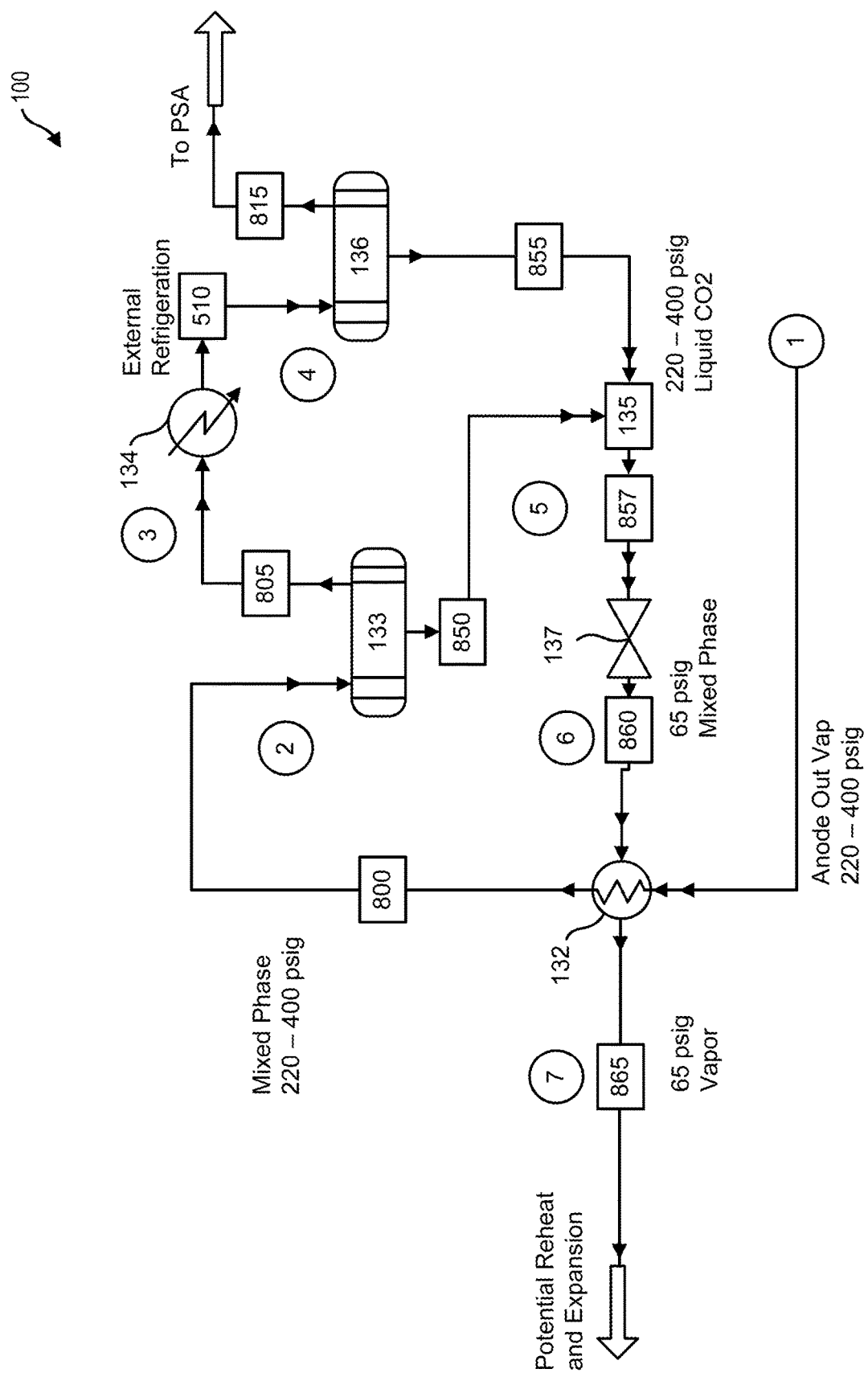
FIG. 1 shows a schematic view of a carbon dioxide removal system for a fuel cell that separates carbon dioxide by cooling/condensation.

FIG. 1 shows a carbon dioxide removal system 100. The carbon dioxide removal system 100 is part of a fuel cell power production system with $H_2$ or syngas co-production comprising a high-temperature fuel cell and recovery of syngas from the fuel cell anode exhaust. The high-temperature fuel cell includes an anode configured to receive fuel from a fuel supply path and to output anode exhaust, a cathode configured to receive oxidant gas and to output cathode exhaust, and an electrolyte matrix configured to separate the anode and the cathode. The high-temperature fuel cell may be a molten carbonate fuel cell or any other known fuel cell type.

Anode exhaust comprises unreacted hydrogen, carbon monoxide, water vapor, carbon dioxide and trace amounts of other gases. As seen in Stage 1 of FIG. 1, compressed anode exhaust vapor (i.e., pressurized anode exhaust) is input into a feed/effluent heat exchanger 132. Prior to entering the feed/effluent heat exchanger 132, the anode exhaust is compressed to a pressure between 200 and 400 psig, for example, after a shift unit and/or water condensation (not illustrated) that occurs upstream of Stage 1 and downstream of the output of the anode. For example, as described in U.S. Pat. No. 8,815,462, prior to Stage 1, the anode exhaust may be cooled by adding water to the anode exhaust to partially cool the anode exhaust and/or passing the anode exhaust through a shift reactor (i.e., a shift unit) to convert CO in the anode exhaust to $H_2$ prior to compression. The entire contents of U.S. Pat. No. 8,815,462 are incorporated herein by reference in its entirety for its disclosures related to fuel cell power production systems and components for extracting and exporting hydrogen fuel from the anode exhaust.

The feed/effluent heat exchanger 132 cools the anode exhaust vapor to approximately −35° F. and partially condenses the $CO_2$. The temperature required will vary depending on the pressure used, but must be low enough so that the $CO_2$ in the anode exhaust condenses as the lower pressure liquid $CO_2$ vaporizes.

In Stage 2, the mixed phase anode exhaust 800 output from the feed/effluent heat exchanger 132 is input into a first vapor-liquid separator (e.g., a knock out pot) 133. The first knock out pot 133 is configured to separate liquid $CO_2$ 850 from uncondensed anode exhaust vapor 805.

In Stage 5, the liquid $CO_2$ 850 is output from the first knock out pot 133 via a first outlet path of the first knock out pot 133 and input into a mixer 135. The mixer 135 will be discussed in further detail below.

In Stage 3, the uncondensed anode exhaust vapor 805 is output from the first knock out pot 133 via a second outlet path of the first knock out pot 133 and input into a feed/refrigerant heat exchanger 134. The feed/refrigerant heat exchanger 134 further cools the uncondensed anode exhaust vapor 805 to the lowest temperature reasonable (approximately −45° F.) and condenses more $CO_2$ using external refrigeration. In Stage 4, a mixed phase anode exhaust 510 is output from the feed/refrigerant heat exchanger 134 and input into a second vapor-liquid separator (e.g., a knock out pot) 136. The second knock out pot 136 is configured to separate liquid $CO_2$ 855 from $H_2$ rich, uncondensed anode exhaust vapor 815. The second knock out pot 136 may be any known vapor-liquid separator. The $H_2$ rich, uncondensed anode exhaust vapor 815 is output from the second knock out pot 136 via a first outlet path of the second knock out pot 136 and input into a pressure swing adsorption system (PSA) configured to separate the carbon dioxide and other impurities from the hydrogen. The liquid $CO_2$ 855 is output from the second knock out pot 136 via a second outlet path of the second knock out pot 136 and input into the mixer 135.

required to compress the gas, depending upon the level of compression chosen. At a higher pressure, more $CO_2$ will condense, allowing a smaller PSA to be used. However, more power will be required by the compressor to provide the higher pressure. A summary of the impact of pressure on the performance of the carbon dioxide removal system 100 is provided in Table 1 below. The optimum compression power appears to be around 300 psig based on the simulations performed by the inventors.

TABLE 1

| Case | System Pressure, psia | Refrig Duty, mmbtu/hr | Refrig Duty, kw | Compression, kw for 400 psig H2 * | % $CO_2$ in Feed to PSA | Tot PSA Feed, m/h | $CO_2$ % reduction | Comp + Refrig Pwr | Net Power w Expander ** |
|---|---|---|---|---|---|---|---|---|---|
| No Removal | 224.5 | 0.000 | 0.00 | 471 | 68.2% | 262.7 | 0.0% | 471 | 471 |
| Lower Pressure | 224.5 | 0.286 | 83.94 | 471 | 61.8% | 218.0 | 16.5% | 555 | 498 |
| Medium Pressure | 314.5 | 0.175 | 51.17 | 516 | 46.1% | 153.5 | 54.6% | 567 | 465 |
| Higher Pressure | 415 | 0.119 | 34.91 | 571 | 32.9% | 122.1 | 73.1% | 606 | 482 |

* Includes compression of pure $H_2$ from PSA to 400 psig (no further compression needed for 415 psia case)
** Assumes $CO_2$ off gas at 65 psig is heated with waste heat to 1000° F. and expanded to 2 psig to generate power and offset part of compression + refrigeration power requirements.

In the mixer 135, the liquid $CO_2$ 850 output from the first knock out pot 133 is combined with the liquid $CO_2$ 855 output from the second knock out pot 136. A total liquid $CO_2$ 857 (i.e., the liquid $CO_2$ 850 output from the first knock out pot 133 mixed with the liquid $CO_2$ 855 output from the second knock out pot 136) has a pressure of approximately 200 to 400 psig.

In Stage 6, the total liquid $CO_2$ 857 is passed through a pressure reduction valve 137. The pressure reduction valve 137 is configured to reduce a pressure of the total liquid $CO_2$ 857. As the pressure is reduced, part of the liquid $CO_2$ vaporizes (or flashes) which cools the $CO_2$. A flashed liquid $CO_2$ 860 is output from the pressure reduction valve 137. The liquid $CO_2$ 860 has a lower pressure than the pressure of the total liquid $CO_2$ 857. For example, the liquid $CO_2$ 860 has a pressure of approximately 65 psig. The flash pressure should be high enough so that the temperature remains above the freezing point of the $CO_2$ and solid $CO_2$ in the system is avoided.

The liquid 860 $CO_2$ is configured to vaporize at a low temperature to provide cooling in the feed/effluent heat exchanger 132. Below a pressure of approximately 65 psig, the liquid $CO_2$ 860 may potentially freeze. At a pressure of 65 psig, the liquid $CO_2$ 860 vaporizes at approximately −60° F. Vaporized $CO_2$ from the liquid $CO_2$ 860 serves as the cooling media used in the anode exhaust vapor in the feed/effluent heat exchanger 132. With this configuration, the bulk of the refrigeration duty is accomplished by vaporizing the $CO_2$, and the external refrigeration duty is reduced to less than 20% of the total cooling required.

In an optional Stage 7, after being used to cool/condense the anode exhaust vapor in the feed/effluent heat exchanger 132, a reheated $CO_2$ stream 865 (i.e., vaporized $CO_2$) is output from the feed/effluent heat exchanger 132. The reheated $CO_2$ stream 865 has a pressure, for example, of approximately 65 psig. The reheated $CO_2$ stream 865 may be fed to an element (not illustrated) for potential reheating and expansion. For example, the reheated $CO_2$ stream 865 may be heated up using waste heat from the high-temperature fuel cell and sent to an expander to recover additional energy. The expander can provide 15 to 20% of the power The calculations of Table 1 assume the anode exhaust rate and properties summarized in Table 2 below:

TABLE 2

| Stream Name | Shifted Anode Exhaust Gas from Blower |
|---|---|
| Molar flow (lbmol/hr) | 323 |
| Mass flow (lb/hr) | 10,217 |
| Temp (F.) | 142° |
| Pres (psia) | 16.50 |
| Standard Cubic Feet per Minute (SCFM) | 2,043 |
| Average mol wt | 31.64 |

| Components | lb-mole/hr | mole % |
|---|---|---|
| Hydrogen | 77.47 | 23.99 |
| Methane | 0.27 | 0.08 |
| Carbon Monoxide | 5.13 | 1.59 |
| Carbon Dioxide | 214.70 | 66.48 |
| Water | 24.73 | 7.66 |
| Nitrogen | 0.65 | 0.20 |
| Total | 322.96 | 100.00 |

Figure 2:
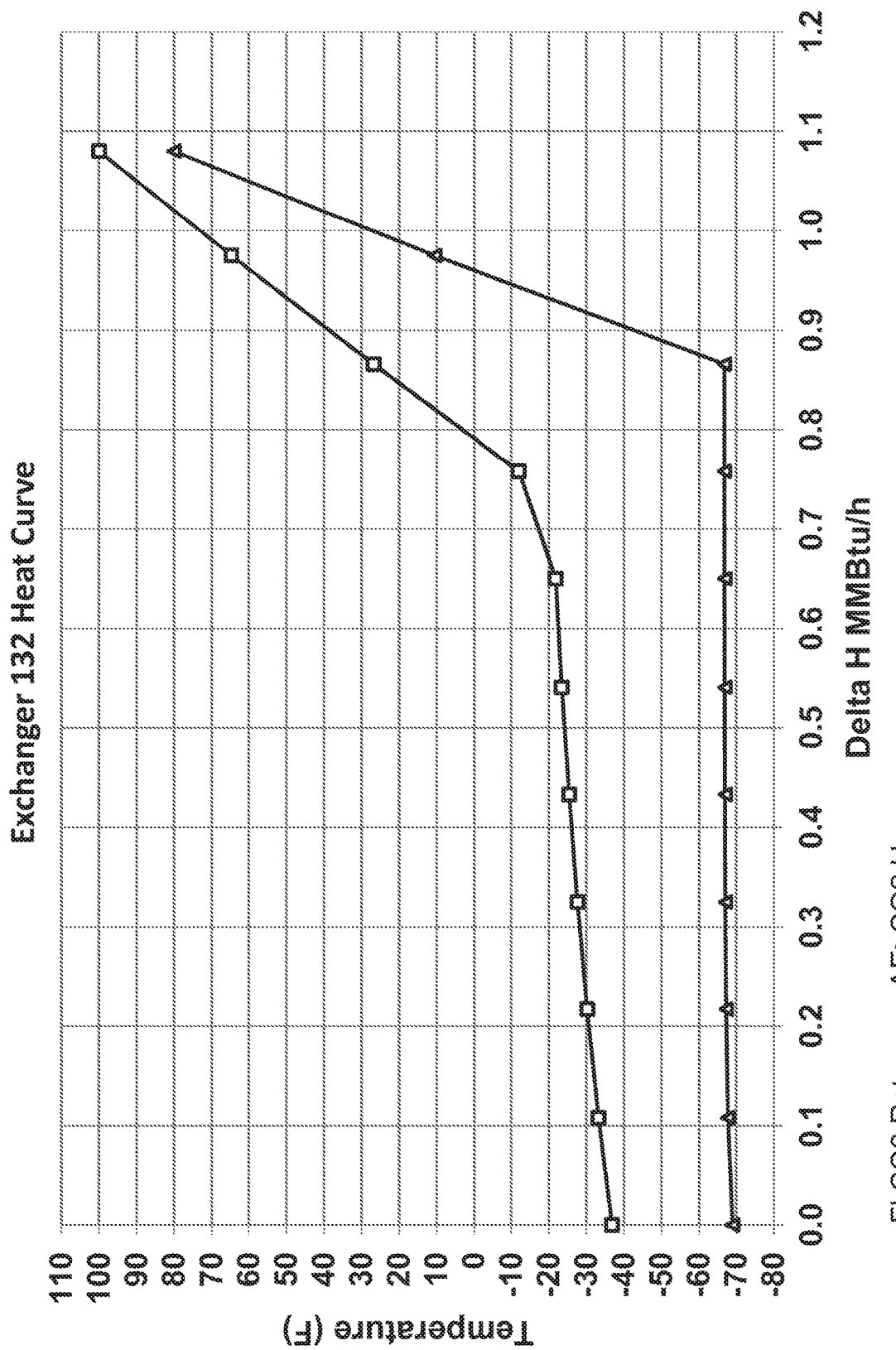
FIG. 2 is a graph illustrating a typical heat curve for the feed/effluent heat exchanger of the carbon dioxide removal system of FIG. 1.

A typical heat curve for the feed/effluent heat exchanger 132 is illustrated in FIG. 2 for a countercurrent heat exchanger. More likely, multiple shells would be used to optimize the heat recovery in the feed/effluent heat exchanger 132 since the inlet of the feed gas and the outlet of the reheated $CO_2$ is much higher than the temperature at which the $CO_2$ vaporizes.

The carbon dioxide removal system 100 described above, allows for a reduction in size, and therefore, cost of the PSA or other purification system, and maximizes hydrogen/syngas production by removing carbon dioxide which increases recovery in the PSA. Using cooling/condensation, the carbon dioxide removal system 100 removes carbon dioxide from anode exhaust without the addition of a physical solvent such as Selexol.

In other embodiments, the carbon dioxide removal system 100 may be used in conjunction with a physical solvent such as SELEXOL® to increase removal of the $CO_2$. For syngas production, where often some small amount of $CO_2$ in the syngas is acceptable, a solvent removal system such as SELEXOL® could be used in place of a PSA While the carbon dioxide removal system 100 is described as having two heat exchangers and two knock out pots, the present invention is not limited in this regard. Any number of heat exchangers and knock out pots can be used, provided appropriate levels of condensation and separation are achieved. In certain embodiments, the number of heat exchangers equals the number of knock out pots. In certain embodiments, the number of heat exchangers is different from the number of knock out pots. In general, separation of liquid carbon dioxide and uncondensed anode exhaust will occur in a knock out pot downstream of a heat exchanger.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus or processing circuit on data stored on one or more computer-readable storage devices or received from other sources.

The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

What is claimed:

1. A system for removing carbon dioxide from anode exhaust gas that has been compressed to form pressurized anode exhaust vapor, the system comprising:
    a feed/effluent heat exchanger configured to cool the anode exhaust vapor to a first predetermined temperature and partially condense carbon dioxide in the pressurized anode exhaust vapor;
    a first vapor-liquid separator configured to receive an output of the feed/effluent heat exchanger and separate liquid carbon dioxide from uncondensed anode exhaust vapor;
    a feed/refrigerant heat exchanger configured to receive the uncondensed anode exhaust vapor from the first vapor-liquid separator, cool the uncondensed anode exhaust vapor to a second predetermined temperature, and condense additional carbon dioxide in the uncondensed anode exhaust vapor;
    a second vapor-liquid separator configured to receive an output of the feed/refrigerant heat exchanger and separate liquid carbon dioxide to form hydrogen rich, uncondensed anode exhaust vapor;
    a mixer configured to receive and mix the liquid carbon dioxide separated by the first vapor-liquid separator and the liquid carbon dioxide separated by the second vapor-liquid separator; and
    a pressure reduction valve configured to receive a total liquid carbon dioxide from the mixer, the total liquid carbon dioxide comprising the liquid carbon dioxide separated by the first vapor-liquid separator and the liquid carbon dioxide separated by the second vapor-liquid separator, wherein:
    the pressure reduction valve is further configured to reduce a pressure of the total liquid carbon dioxide from a first pressure to a second pressure lower than the first pressure, and
    the feed/effluent heat exchanger is configured to receive the total liquid carbon dioxide having the second pressure and to use the total liquid carbon dioxide as a cooling media.

2. The system of claim 1, wherein after being used as the cooling media in the feed/effluent heat exchanger, the total liquid carbon dioxide is output from the feed/effluent heat exchanger as a reheated carbon dioxide stream, and
    wherein the reheated carbon dioxide stream is further heated and sent to an expander to recover additional energy either as power or mechanical energy.

3. The system of claim 1, wherein the first pressure is from 200 to 400 psig and the second pressure is from 65 to 100 psig.

4. The system of claim 1, wherein the anode exhaust vapor has a pressure from 200 to 400 psig at an inlet of the feed/effluent heat exchanger.

5. The system of claim 1, wherein the feed/refrigerant heat exchanger cools the uncondensed anode exhaust vapor to the second predetermined temperature and condenses carbon dioxide in the uncondensed anode exhaust vapor using external refrigeration.

6. The system of claim 1, further comprising a shift unit or a water condensation unit configured to compress the anode exhaust gas to form the anode exhaust vapor upstream of the feed/effluent heat exchanger,
    wherein the anode exhaust vapor has a pressure from 200 to 400 psig at an inlet of the feed/effluent heat exchanger.

7. The system of claim 1, further comprising a flow path configured to receive a portion of the carbon dioxide separated from the anode exhaust vapor and to export the portion of the carbon dioxide separated from the anode exhaust vapor for sequestration or other uses.

8. A fuel cell system comprising:
    a fuel cell comprising a cathode, an anode, and an electrolyte matrix provided between the cathode and the anode;
    the system of claim 1 for removing carbon dioxide from anode exhaust gas to form hydrogen rich, uncondensed anode exhaust vapor; and
    a pressure swing adsorption system configured to separate carbon dioxide and other impurities from the hydrogen rich, uncondensed anode exhaust vapor to purify hydrogen or syngas from the anode exhaust gas.

9. A method of removing carbon dioxide from anode exhaust gas, the method comprising:
    compressing the anode exhaust gas to form anode exhaust vapor;
    cooling the anode exhaust vapor to a first predetermined temperature and partially condensing carbon dioxide in the anode exhaust vapor in a first heat exchanger;
    receiving an output of the first heat exchanger in a first vapor-liquid separator;
    separating liquid carbon dioxide from uncondensed anode exhaust vapor in the first vapor-liquid separator;
    receiving the uncondensed anode exhaust vapor from the first vapor-liquid separator in a second heat exchanger;

cooling the uncondensed anode exhaust vapor to a second predetermined temperature and condensing carbon dioxide in the uncondensed anode exhaust vapor in the second heat exchanger;

receiving an output of the second heat exchanger in a second vapor-liquid separator;

separating, in the second vapor-liquid separator, liquid carbon dioxide from the output of the second heat exchanger to form hydrogen rich, uncondensed anode exhaust vapor;

receiving and mixing the liquid carbon dioxide separated by the first vapor-liquid separator and the liquid carbon dioxide separated by the second vapor-liquid separator to form a total liquid carbon dioxide;

reducing a pressure of the total liquid carbon dioxide from a first pressure to a second pressure lower than the first pressure by passing the total liquid carbon dioxide through a pressure reduction valve;

feeding the total liquid carbon dioxide having the second pressure to the first heat exchanger; and cooling the first heat exchanger using the total liquid carbon dioxide.

10. The method of claim 9, wherein the cooling step reheats the total liquid carbon dioxide such that a reheated carbon dioxide stream is output from the first heat exchanger, and the method further comprises:

further heating the reheated carbon dioxide stream; and recovering additional energy from the further heated reheated carbon dioxide stream using an expander.

11. The method of claim 9, wherein the first pressure is from 200 to 400 psig and the second pressure is from 65 to 100 psig.

12. The method of claim 9, wherein the step of compressing the anode exhaust gas to form the anode exhaust vapor comprises compressing the anode exhaust gas to a pressure from 200 to 400 psig.

13. The method of claim 9, wherein the step of cooling the uncondensed anode exhaust vapor to the second predetermined temperature and condensing carbon dioxide in the uncondensed anode exhaust vapor in the second heat exchanger is performed using external refrigeration.

14. The method of claim 9, further comprising purifying the hydrogen rich, uncondensed anode exhaust vapor by separating carbon dioxide and other impurities therefrom.

15. The method of claim 14, wherein the step of purifying the hydrogen rich, uncondensed anode exhaust vapor comprises feeding the hydrogen rich, uncondensed anode exhaust vapor output from the second vapor-liquid separator to a pressure swing adsorption system.

* * * * *